United States Patent
Gupta et al.

(10) Patent No.: US 11,606,745 B2
(45) Date of Patent: Mar. 14, 2023

(54) SYSTEM, METHOD, AND COMPUTER PROGRAM FOR ORCHESTRATING RE-PROVISIONING OF NETWORK SUBSCRIBER DEDICATED NETWORK SLICES

(71) Applicant: Amdocs Development Limited, Limassol (CY)

(72) Inventors: Himant Gupta, Bilaspur (IN); Sagar Tayal, Ambala (IN); Abhijit Singh, Sydney (AU)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 69 days.

(21) Appl. No.: 17/239,409

(22) Filed: Apr. 23, 2021

(65) Prior Publication Data
US 2022/0345995 A1  Oct. 27, 2022

(51) Int. Cl.
| | |
|---|---|
| H04W 4/00 | (2018.01) |
| G06F 15/173 | (2006.01) |
| H04W 48/18 | (2009.01) |
| H04W 4/50 | (2018.01) |
| H04W 4/24 | (2018.01) |
| H04W 8/18 | (2009.01) |
| H04W 8/20 | (2009.01) |
| H04W 24/02 | (2009.01) |

(52) U.S. Cl.
CPC ............ *H04W 48/18* (2013.01); *H04W 4/24* (2013.01); *H04W 4/50* (2018.02); *H04W 8/186* (2013.01); *H04W 8/20* (2013.01); *H04W 24/02* (2013.01)

(58) Field of Classification Search
CPC ......... H04W 48/18; H04W 4/50; H04W 4/24; H04W 8/186; H04W 8/20; H04W 24/02
USPC ...................................................... 370/329
See application file for complete search history.

(56) References Cited

U.S. PATENT DOCUMENTS

| | | | |
|---|---|---|---|
| 7,043,225 B1 | 5/2006 | Patel et al. | |
| 7,054,938 B2 | 5/2006 | Sundqvist et al. | |
| 8,868,466 B2 | 10/2014 | Stanforth et al. | |
| 2006/0031082 A1 | 2/2006 | Amaitis et al. | |
| 2006/0143111 A1 | 6/2006 | Mylet | |
| 2009/0003201 A1* | 1/2009 | Horvitz | H04L 41/147 370/229 |
| 2010/0145862 A1 | 6/2010 | Chang | |
| 2011/0125905 A1* | 5/2011 | Baucke | H04W 4/24 709/226 |
| 2013/0015809 A1* | 1/2013 | Frey | B60L 53/30 320/106 |

(Continued)

OTHER PUBLICATIONS

International Search Report and Written Opinion from PCT Application No. PCT/IB2022/053624, dated Jun. 29, 2022.

(Continued)

*Primary Examiner* — Mark G. Pannell
(74) *Attorney, Agent, or Firm* — Zilka-Kotab, P.C.

(57) ABSTRACT

As described herein, a system, method, and computer program are provided for orchestrating re-provisioning of network subscriber dedicated network slices. A request is received from an entity for use of a network. Network slice information indicating a plurality of slices of the network dedicated to a plurality of network subscribers is accessed. Provisioning of one of more slices of the plurality of slices to the entity is orchestrated, according to the request.

18 Claims, 6 Drawing Sheets

(56) References Cited

U.S. PATENT DOCUMENTS

| | | | |
|---|---|---|---|
| 2016/0353465 A1* | 12/2016 | Vrzic | H04W 28/0221 |
| 2017/0070892 A1* | 3/2017 | Song | H04W 48/20 |
| 2017/0093748 A1 | 3/2017 | Kallin et al. | |
| 2018/0287891 A1* | 10/2018 | Shaw | H04W 24/02 |
| 2018/0359337 A1* | 12/2018 | Kodaypak | H04L 67/52 |
| 2019/0166039 A1* | 5/2019 | Wen | G06F 9/45558 |
| 2019/0372853 A1* | 12/2019 | Bainbridge | H04L 49/354 |
| 2020/0195495 A1 | 6/2020 | Parker et al. | |
| 2020/0314628 A1* | 10/2020 | Panchal | H04L 41/5022 |
| 2020/0404480 A1* | 12/2020 | Zhu | H04W 48/12 |
| 2022/0060904 A1* | 2/2022 | Das | H04L 41/12 |

OTHER PUBLICATIONS

3GPP, "3rd Generation Partnership Project; Technical Specification Group Services and System Aspects; Management and orchestration; Provisioning; (Release 16)," 3GPP Techical Specification TS 28.531 V16.9.0, 2021, 73 pages.

\* cited by examiner

SYSTEM, METHOD, AND COMPUTER PROGRAM FOR ORCHESTRATING RE-PROVISIONING OF NETWORK SUBSCRIBER DEDICATED NETWORK SLICES

FIELD OF THE INVENTION

The present invention relates to provisioning network slices.

BACKGROUND

Typically, a user must subscribe to a service in order to access any network. The subscription may include a terms agreed upon by the entity and the network provider. For example, the entity may be allowed a certain amount of network usage (e.g. monthly) in exchange for a fee.

Unfortunately, traditionally available subscription plans do not support on-demand, one-time limited use of a network. This type of on-demand access would be useful when a non-subscribing user, or other third party entity, requires a limited amount of usage of a particular network for a limited amount of time, sometimes with a required bandwidth. On the other hand, users that do have a network service subscription may underutilize their allotted usage of the network. Accordingly, it may be desirable for those subscribers to have the ability to resell, or re-provision, a portion of their allotted usage, on-demand, to a non-subscriber or other third party entity.

There is thus a need for addressing these and/or other issues associated with the prior art.

SUMMARY

As described herein, a system, method, and computer program are provided for orchestrating re-provisioning of network subscriber dedicated network slices. A request is received from an entity for use of a network. Network slice information indicating a plurality of slices of the network dedicated to a plurality of network subscribers is accessed. Provisioning of one of more slices of the plurality of slices to the entity is orchestrated, according to the request.

DETAILED DESCRIPTION

Figure 1:
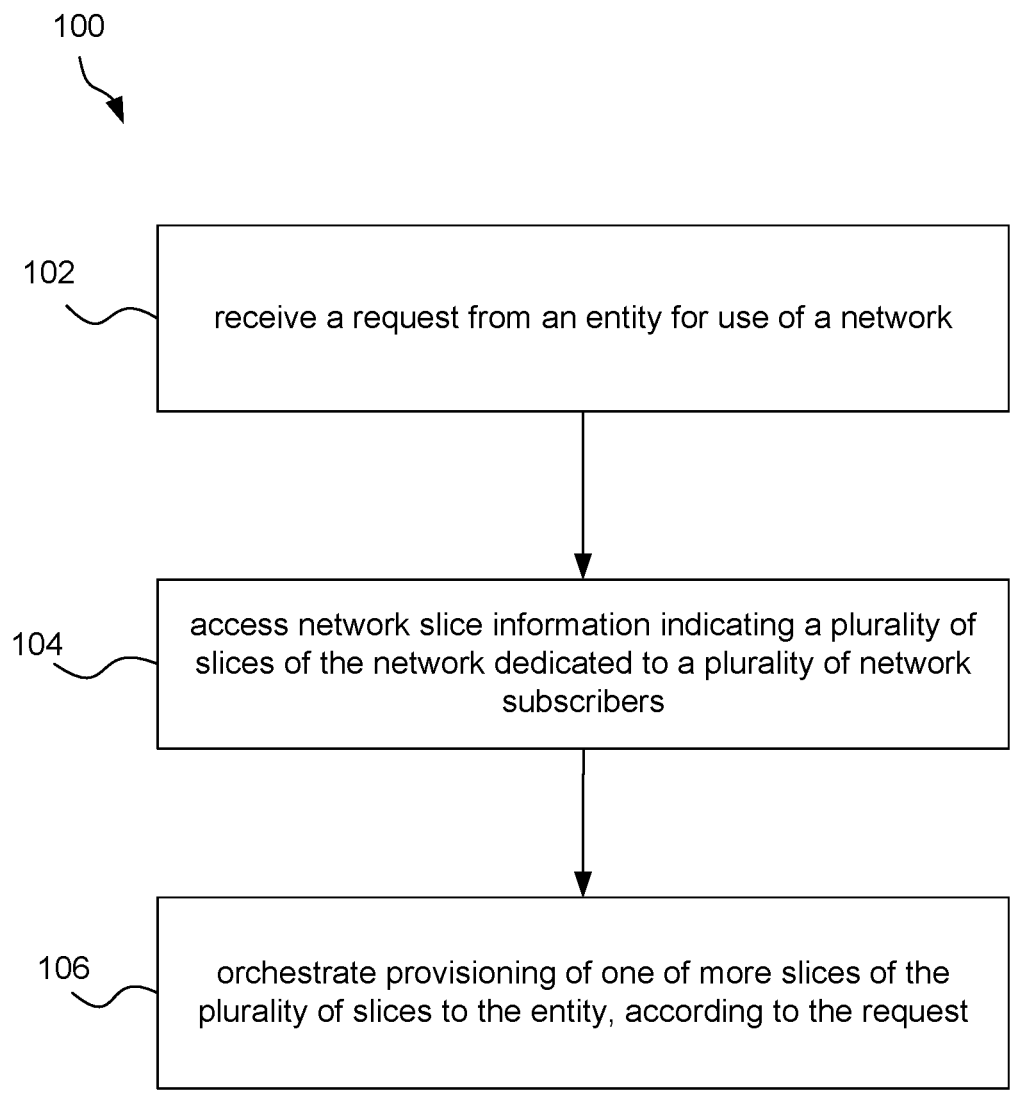
FIG. 1 illustrates a method for orchestrating re-provisioning of network subscriber dedicated network slices, in accordance with one embodiment.

FIG. 1 illustrates a method 100 for orchestrating re-provisioning of network subscriber dedicated network slices, in accordance with one embodiment. The method 100 may be performed by any computer system described below with respect to FIGS. 5 and/or 6. For example, the method 100 may be performed by a platform operating on a network operator-independent computer system, where the platform is thereby used to orchestrate re-provisioning of network slices in a plurality of different networks provided by a plurality of different network operators (i.e. providers). As another example, the method 100 may be performed by a platform operating on a computer system of a particular network operator, where the platform is thereby used to orchestrate re-provisioning of network slices in the network provided by the network operator.

In operation 102, a request is received from an entity for use of a network. The entity may be an end user or a business/enterprise user. It should be noted that the entity may not necessarily be a subscriber to the network, or may be a subscriber to the network who requires use of the network that exceeds their subscription plan. As an option, the request may be received via a portal accessible to the entity.

It should be noted that the network may be a 5G network or any other type of network whereby network slicing is enabled. In general, network slicing typically refers to a type of virtual networking architecture in which multiple virtual networks can be created from a shared physical network infrastructure. The virtual networks, referred to as slices in the network, or network slice instances (NSIs), are logical (software-based) partitions of the shared resources of the physical network, such as the compute and storage resources of the physical network. Each slice may also be composed of a set of virtual network functions, or network function instances, which require the shared resource partition. To this end, each slice may be utilized to provide a particular network service. The slices may be deployed to provide the network services to different entities (e.g. subscribers) per the requirements of those entities.

Referring back to operation 102, the request for use of the network may include any information describing the use. In one embodiment, the request may include requirements for the use of the network. The requirements may be an indicator of the network, a slice type, a duration of use, a start time and date of the use, and/or a location of the use, for example. In one exemplary use case scenario, the request may correspond to a fixed event with a fixed date, time and expected attendee count, where use of the network is desired for the attendees of the event (e.g. a concert), in particular via dedicated streams possibly with low latency.

In operation 104, network slice information indicating a plurality of slices of the network dedicated to a plurality of network subscribers is accessed. In one embodiment, the network subscribers may be entities (e.g. end users or businesses/enterprises) having a subscription to a network service providing access to the network. In this way, one or more slices of the network may be dedicated (e.g. assigned, reserved, etc.) for use by each of the network subscribers (e.g. per the terms of the subscription of the network subscriber). The network slice information may be made accessible by the network operator.

In operation 106, provisioning of one of more slices of the plurality of slices to the entity is orchestrated, according to the request. In one embodiment, orchestrating provisioning of one of more slices of the plurality of slices to the entity may include selecting the one or more slices of the plurality of slices based on the requirements for the use of the network. For example, the one or more slices may be selected responsive to a determination that the one or more slices satisfy the requirements for the use of the network (as specified in the request).

In another embodiment, orchestrating provisioning of one of more slices of the plurality of slices to the entity may include predicting availability of the one of more slices of the plurality of slices for the use of the network. The availability may be predicted using a machine learning algorithm applied to historical usage data known for the plurality of slices, as an option. The machine learning algorithm may be supported in, for example, the 5G cloud native support of having artificial intelligence (AI) logic. With respect to the "requirements" mentioned above, the availability may refer to the one of more slices being able to meet the requirements of the use of the network.

In yet another embodiment, orchestrating provisioning of one of more slices of the plurality of slices to the entity may include making an offer to the entity for the use of the one of more slices of the plurality of slices. The offer may include a price defined for the use of the one of more slices of the plurality of slices. In turn, orchestrating provisioning of one of more slices of the plurality of slices to the entity may include receiving an acceptance of the offer from the entity. The acceptance may include payment of a price defined for the use of the one of more slices of the plurality of slices.

In still yet another embodiment, orchestrating provisioning of one of more slices of the plurality of slices to the entity may include mapping a network service associated with the network to a virtual network function, according to the request. For example, the network service may be mapped to the virtual network function according to the requirements included in the request. In another embodiment, orchestrating provisioning of one of more slices of the plurality of slices to the entity may include activating the virtual network function for the one or more slices of the plurality of slices.

In a further embodiment, orchestrating provisioning of one of more slices of the plurality of slices to the entity may include activating one or more electronic subscriber identification modules (eSIMs) for the use of the network (e.g. for the limited duration specified in the requirements). With regard to this embodiment, the orchestrating may also include distributing the one or more eSIMs to the entity. Each eSIM may then be usable by a different user device to access the network via the one of more slices. In general, the eSIM is used for similar purposes as the traditional SIM card, but is digitally integrated with the mobile device, for example as computer code or a software application installed on the mobile device. The eSIM need not be removed from the mobile device, since it can support multiple different subscriber accounts (e.g. to different provider networks) and can activate any of the different subscriber accounts at any given time.

To this end, slices of the network that are dedicated to a subscriber of the network may be re-provisioned to a third party entity, upon request. This method 100 may allow the subscriber to "re-sell" the network slices it has already purchased from the network operator to the third party entity. This may allow the third party entity to obtain on-demand access to the network, for example where the third party entity requires only a limited amount of usage of the particular network for a limited amount of time, possibly with a required bandwidth or other Quality of Service (QoS). The method 100 may also allow the subscriber to monetize slices of the network that they have already purchased but which are predicted to be underutilized.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
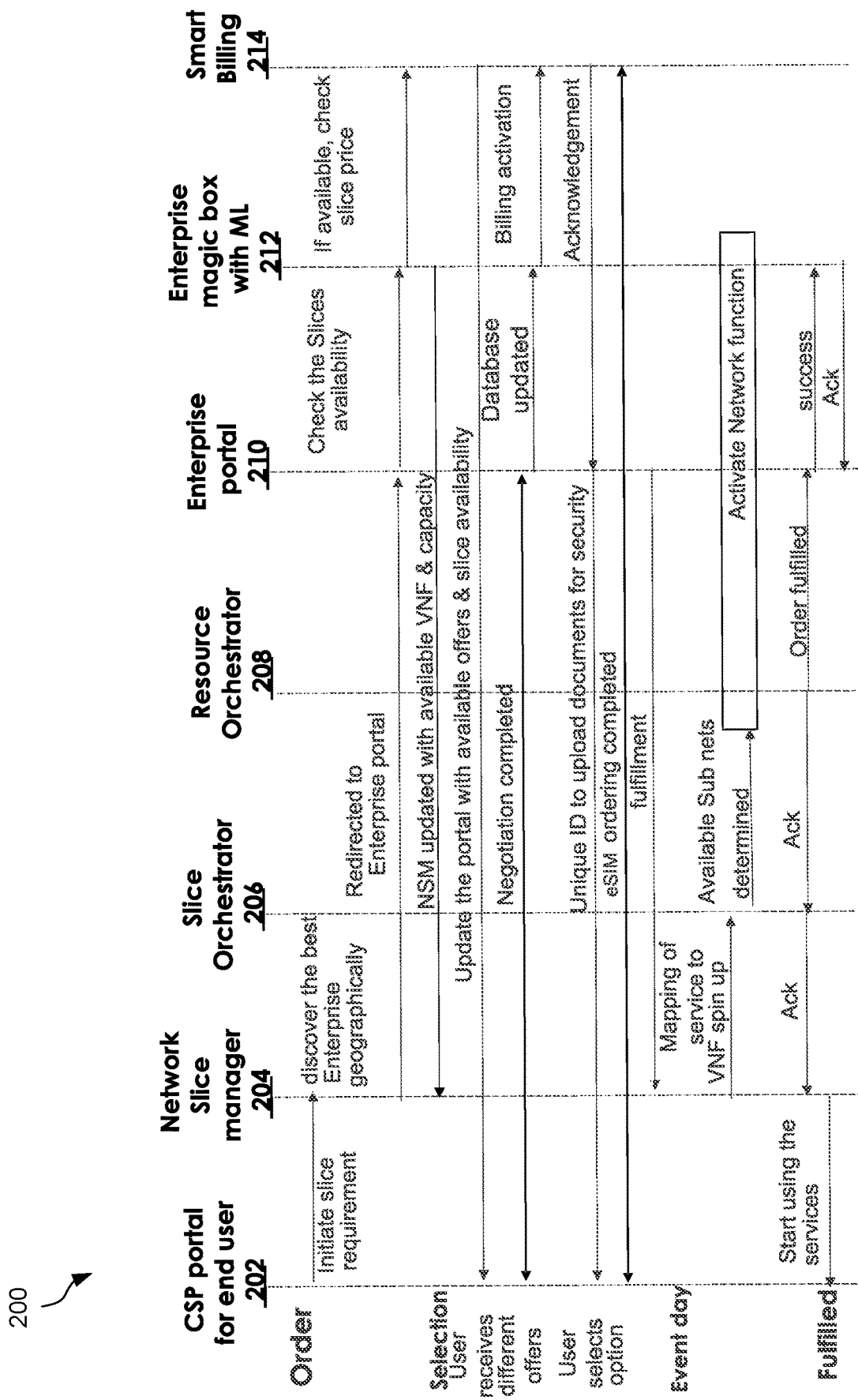
FIG. 2 illustrates a system flow diagram for orchestrating re-provisioning of network subscriber dedicated network slices, in accordance with one embodiment.

FIG. 2 illustrates a system flow 200 for orchestrating re-provisioning of network subscriber dedicated network slices, in accordance with one embodiment. As an option, the system flow 200 may be implemented in the context of the details of the previous figure and/or any subsequent figure(s). Of course, however, the system flow 200 may be implemented in the context of any desired environment. Further, the aforementioned definitions may equally apply to the description below.

As shown, an end user raises a request on a communication service provider (CSP) portal 202 for use of a network (e.g. for a slice of the network), or in other words initiate an order for the use of the network, including requirements for the use such as slice type, duration of the slice and the location of the slice. In the present embodiment, the end user is looking for a low cost slice, and in this case the user will click on the "Economic" slice type option in the CSP portal 202. The "Enterprise" slice type maps to a flow involving a slice resell, whereas a "Normal" CSP slice type option in the CSP portal 202 maps to a flow involving adding a subscription to the network.

After getting the requirements through the CSP portal 202, a network slice manager (NSM) 204 determines the requirements and makes the discovery query to select the best Enterprise (subscriber) having slices dedicated thereto that are geographically and resourcefully available to satisfy the requirements. The NSM 204 redirects the request directly to the selected enterprise's portal 210 at the backend for the requirement processing.

At the enterprise portal 210, the requirements are gathered and forwarded to a magic box 212 having machine learning capabilities, which further generate the analytics on the historical data of the Enterprise and accordingly provides the results if there is a possibility of provisioning the slices dedicated to the Enterprise. In case the slices are not available, as determined using the analytics, the NSM 204 is updated regarding the unavailability and accordingly uses the discover query to select a next best Enterprise having slices dedicated thereto that are geographically and resourcefully available to satisfy the requirements.

Once it is determined that the slices of a selected enterprise are available as per the end user's order, the request is further forwarded to the smart billing module 214 which handles the billing plans, offers and communicates internally with an eSIM manager (not shown). Subsequently the NSM 204 is updated regarding the availability of a virtual network function in the network and required capacity.

The smart billing module 214 provides the update to CSP portal 202 regarding a slice resell offer to the end user. The offer (e.g. price) may be calculated as per the demand and availability logics built internally in the smart billing module 214. The billing can be done for both an online/offline model. The end user can either reject or accept the offer through the CSP portal 202. In case the offer is accepted and consent is provided by the end user, the NSM 204 is triggered regarding the same.

The NSM 204 starts mapping a network service to the corresponding virtual network function to spin up the virtual network function as per the requirements included in the end user's order. The NSM 204 intimates a slice orchestrator 206 to check the availability of network slice subnets at the platform.

A resource orchestrator 208 is further intimated for activating the virtual network function for the slices. Subsequently, acknowledgement of slice activation is sent to the NSM 204. At the same time, the resource orchestrator 208 updates the enterprise portal 210 to indicate that the slices being resold are now in use. The smart billing module 214 is triggered to activate the billing and the eSIM are ordered as per the order. The end user receives an acknowledgement and a unique identifier (ID) for the uploading of the documents in order to secure the usage of the network. Once the system flow 200 is complete, the end user is provided access to the slices which is fulfillment of the order.

Smart Billing Module 214

The smart billing module 214 may use any predefined algorithm to configure the offer (e.g. price) for the enterprise slice(s). For example, if X slices are bought from the CSP by the enterprise at Y price, the per slice cost is Y/X to the enterprise. As all the slices are not getting utilized, the return on investment for the enterprise is poor.

The prices may be offered on 3 variables:
(1) Availability (in %)(Variable cost);
(2) eSIM management cost (Constant B per eSIM); and
(3) Slice count requested (Variable cost).

Use Case Scenario 1

Let us say the enterprise has 12% slices available on the requested date and there is an end user asking for 10% slices. In this case, the enterprise knows that it will have only 2% slices remaining so already there is high utility and according the charges (price) which the enterprise would apply would be high.

For example, the charges would be (Y/X)*10(Base Price)−0.02*(Y/X)*10(Discount for reselling platform)+10*B(Per eSIM management cost).

Use Case Scenario 1

Let us say enterprise has 52% slices available on the requested date and there is an end user asking for 10% slices. In this case, the Enterprise knows that it will have 42% slice remaining so already there is low utility and accordingly the charges which enterprise would apply would be low.

For example, the charges would be (Y/X)*10(Base Price)−0.42*(Y/X)*10(Discount for reselling platform)+10*B(Per eSIM management cost)

Figure 3:
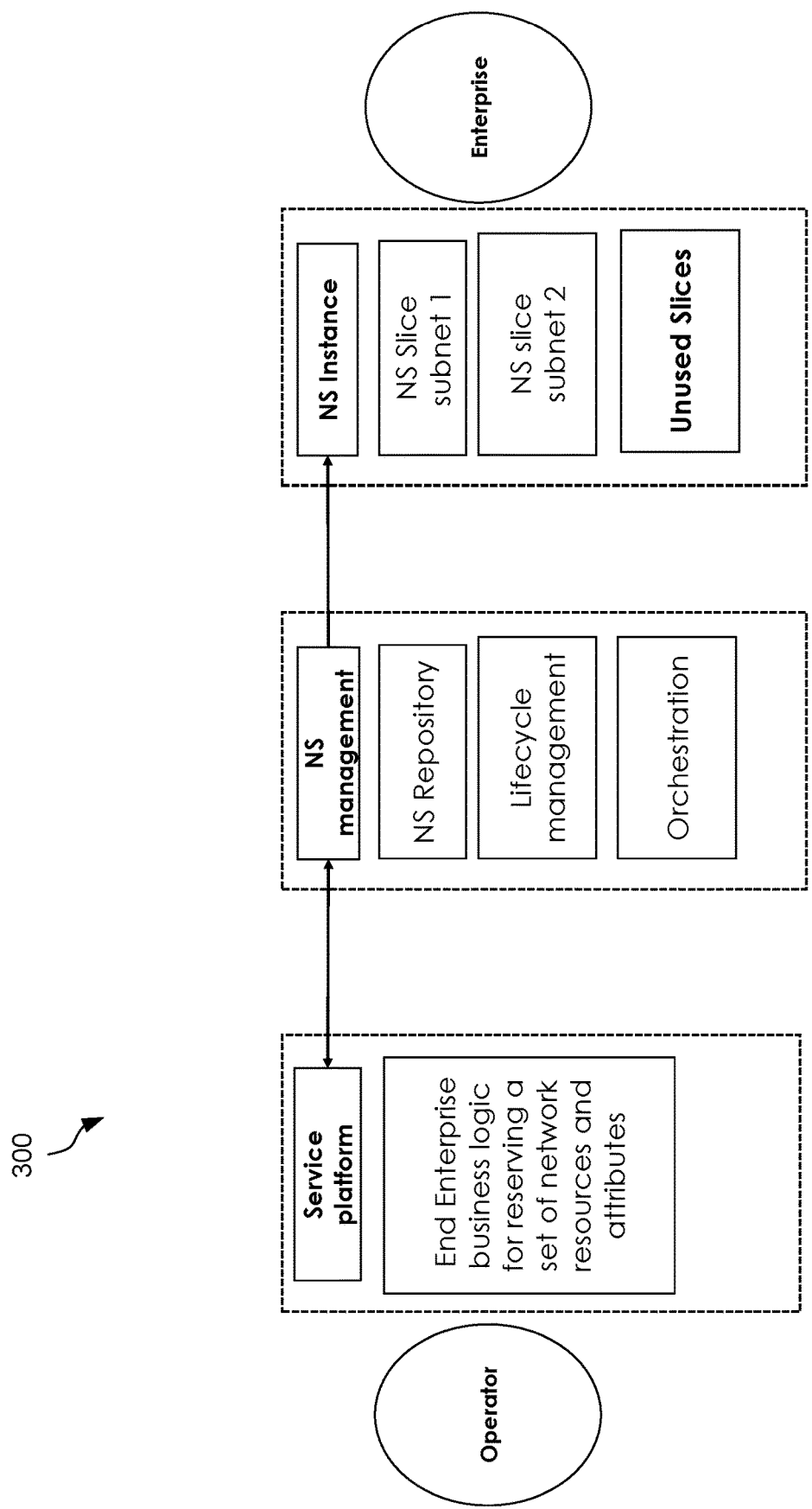
FIG. 3 illustrates a flow diagram corresponding to a slice provider, in accordance with one embodiment.

FIG. 3 illustrates a flow 300 diagram corresponding to a slice provider, in accordance with one embodiment. As an option, the flow 300 may be implemented in the context of the details of the previous figure and/or any subsequent figure(s). Of course, however, the flow 300 may be implemented in the context of any desired environment. Further, the aforementioned definitions may equally apply to the description below.

As shown, a service platform, a network slice manager (NSM), and network slice (NS) instances are provided. The NSM may be NSM 204 of FIG. 2, for example. The service platform includes business logic for reserving a set of network resources and attributes owned by a network operator (i.e. the slice provider). The NSM includes a NS repository that stores network slice information for subscribers, a lifecycle management function that manages the lifecycle of slices, and slice orchestration functionality. The NS instances are slices that are dedicated to an enterprise. They may include used slices that cannot be re-provisioned and/or unused slices that can be re-provisioned, as shown.

Figure 4:
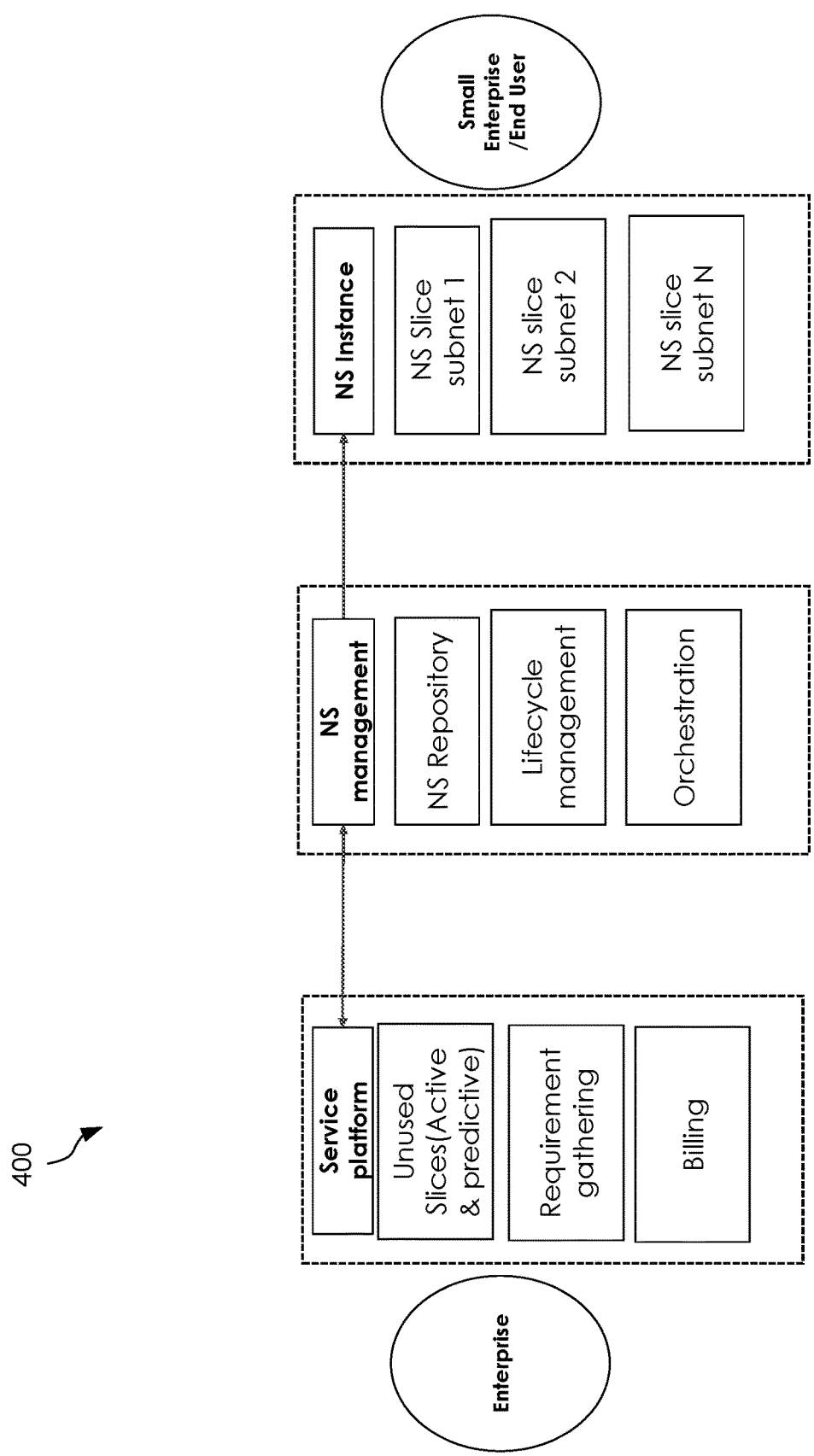
FIG. 4 illustrates a flow diagram corresponding to a network subscriber, in accordance with one embodiment.

FIG. 4 illustrates a flow 400 diagram corresponding to a network subscriber, in accordance with one embodiment. As an option, the flow 400 may be implemented in the context of the details of the previous figure and/or any subsequent figure(s). Of course, however, the flow 400 may be implemented in the context of any desired environment. Further, the aforementioned definitions may equally apply to the description below.

As shown, a service platform, a network slice manager (NSM), and network slice (NS) instances are provided. The NSM may be NSM 204 of FIG. 2, for example. The service platform includes information indicting unused slices of the subscriber (shown as enterprise), both currently unused and those predicted to be unused in the future. The service platform also gathers requirements of end user orders for use of the network as well as billing functionality.

The NSM includes a NS repository that stores network slice information for subscribers, a lifecycle management function that manages the lifecycle of slices, and slice orchestration functionality. The NS instances are slices that are dedicated to the enterprise. They include used slices that are re-provisioned to the end user, as shown.

Figure 5:
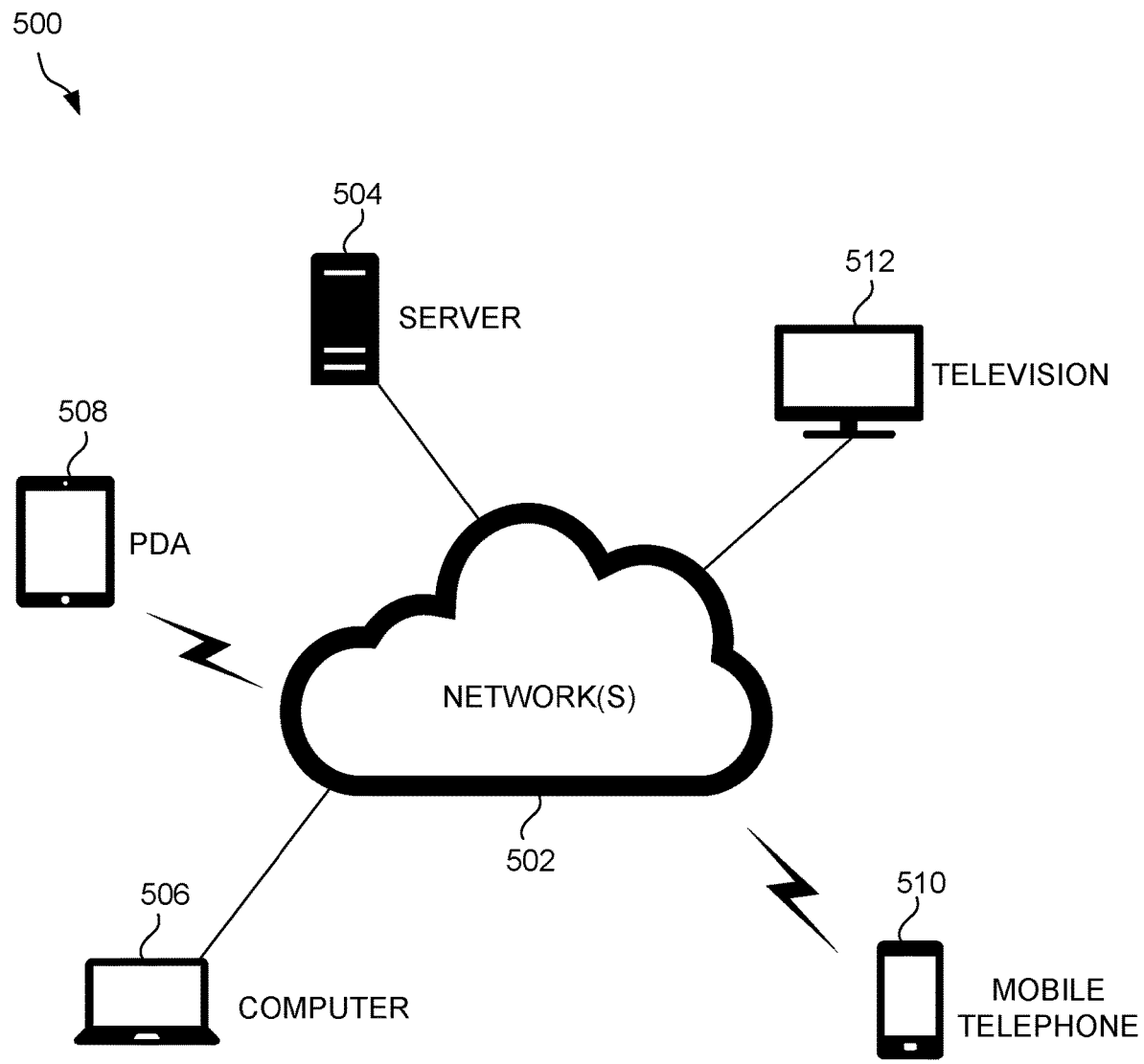
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
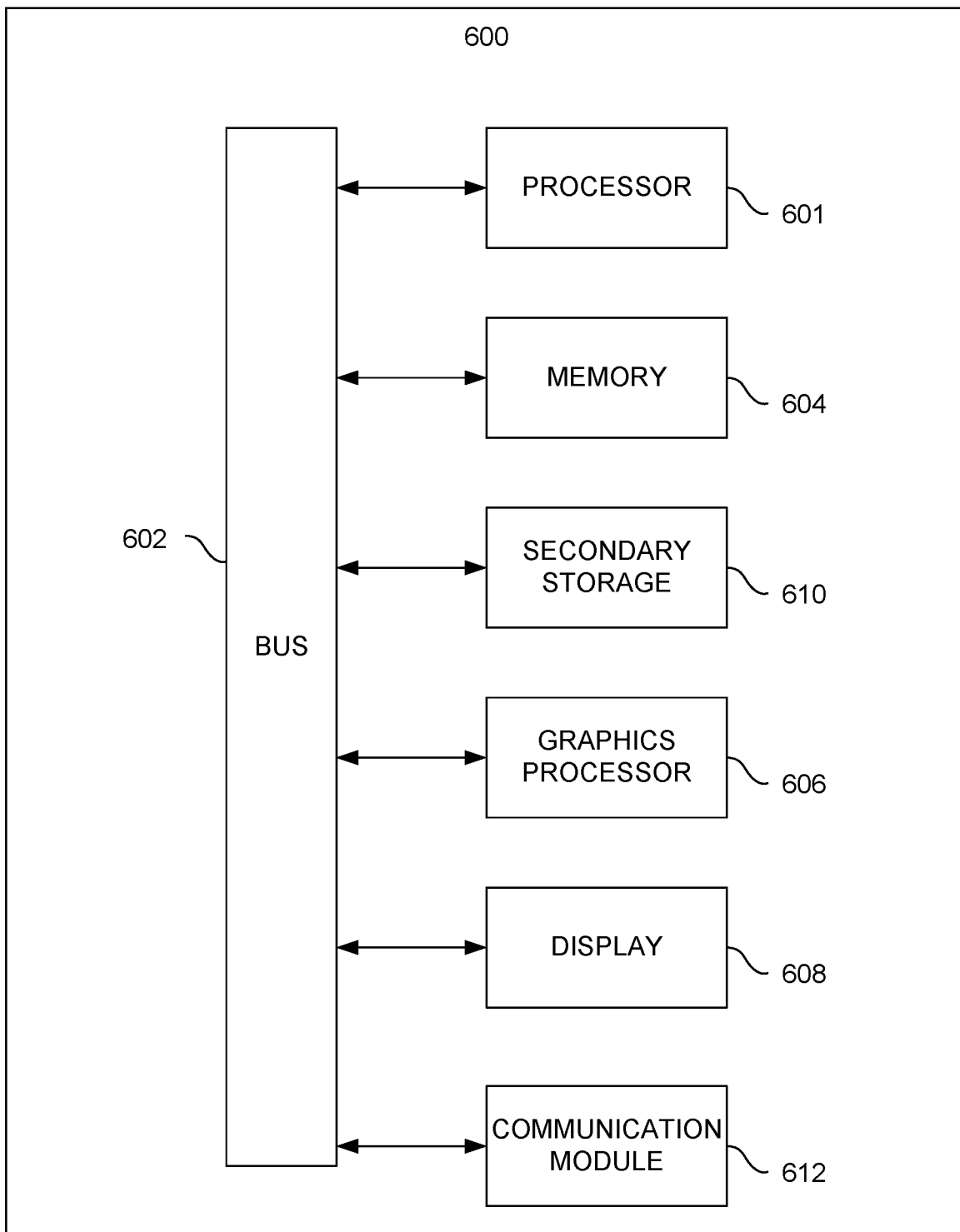
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the one or more processors to cause the device to:

receive a request from an entity for use of a network;

access network slice information indicating a plurality of slices of the network dedicated to a plurality of network subscribers; and orchestrate provisioning of one of more slices of the plurality of slices to the entity, according to the request, including:

mapping a network service associated with the network to a virtual network function, according to requirements included in the request.

2. The non-transitory computer-readable media of claim 1, wherein the network is a 5G network.

3. The non-transitory computer-readable media of claim 1, wherein the requirements are for the use of the network.

4. The non-transitory computer-readable media of claim 3, wherein the requirements include at least one of:
   a slice type,
   a duration of the use, or
   a location of the use.

5. The non-transitory computer-readable media of claim 3, wherein orchestrating provisioning of one of more slices of the plurality of slices to the entity includes:
   selecting the one or more slices of the plurality of slices based on the requirements for the use of the network.

6. The non-transitory computer-readable media of claim 1, wherein orchestrating provisioning of one of more slices of the plurality of slices to the entity includes:
   predicting availability of the one of more slices of the plurality of slices for the use of the network.

7. The non-transitory computer-readable media of claim 6, wherein the availability is predicted using a machine learning algorithm.

8. The non-transitory computer-readable media of claim 1, wherein orchestrating provisioning of one of more slices of the plurality of slices to the entity includes:
   making an offer to the entity for the use of the one of more slices of the plurality of slices.

9. The non-transitory computer-readable media of claim 8, wherein the offer includes a price defined for the use of the one of more slices of the plurality of slices.

10. The non-transitory computer-readable media of claim 8, wherein orchestrating provisioning of one of more slices of the plurality of slices to the entity includes:
    receiving an acceptance of the offer from the entity.

11. The non-transitory computer-readable media of claim 10, wherein the acceptance includes payment of a price defined for the use of the one of more slices of the plurality of slices.

12. The non-transitory computer-readable media of claim 1, wherein orchestrating provisioning of one of more slices of the plurality of slices to the entity includes:
    activating the virtual network function for the one or more slices of the plurality of slices.

13. The non-transitory computer-readable media of claim 1, wherein orchestrating provisioning of one of more slices of the plurality of slices to the entity includes:
    activating one or more eSIMs for the use of the network.

14. The non-transitory computer-readable media of claim 13, wherein orchestrating provisioning of one of more slices of the plurality of slices to the entity includes:
    distributing the one or more eSIMs to the entity.

15. The non-transitory computer-readable media of claim 1, wherein the plurality of network subscribers include enterprise users of the network.

16. The non-transitory computer-readable media of claim 1, wherein the plurality of network subscribers include end users of the network.

17. A method, comprising:
    at a computer system:
    receiving a request from an entity for use of a network;
    accessing network slice information indicating a plurality of slices of the network dedicated to a plurality of network subscribers; and
    orchestrating provisioning of one of more slices of the plurality of slices to the entity, according to the request, including:
    mapping a network service associated with the network to a virtual network function, according to requirements included in the request.

18. A system, comprising:
    a non-transitory memory storing instructions; and
    one or more processors in communication with the non-transitory memory that execute the instructions to:
    receive a request from an entity for use of a network;
    access network slice information indicating a plurality of slices of the network dedicated to a plurality of network subscribers; and
    orchestrate provisioning of one of more slices of the plurality of slices to the entity, according to the request, including:
    mapping a network service associated with the network to a virtual network function, according to requirements included in the request.

* * * * *